US012532865B2

(12) United States Patent
Leigh-Lancaster et al.

(10) Patent No.: US 12,532,865 B2
(45) Date of Patent: Jan. 27, 2026

(54) SYSTEM AND METHOD FOR CONTROLLING ANIMALS

(71) Applicant: AGERSENS PTY LTD, Camberwell (AU)

(72) Inventors: Chris Leigh-Lancaster, Camberwell (AU); Sally Haynes, Camberwell (AU); Tanusri Bhattacharya, Camberwell (AU)

(73) Assignee: AGERSENS PTY LTD, Camberwell (AU)

( * ) Notice: Subject to any disclaimer, the term of this patent is extended or adjusted under 35 U.S.C. 154(b) by 719 days.

(21) Appl. No.: 17/250,782

(22) PCT Filed: Sep. 2, 2019

(86) PCT No.: PCT/AU2019/050927
§ 371 (c)(1),
(2) Date: Mar. 3, 2021

(87) PCT Pub. No.: WO2020/047581
PCT Pub. Date: Mar. 12, 2020

(65) Prior Publication Data
US 2021/0337768 A1  Nov. 4, 2021

(30) Foreign Application Priority Data
Sep. 4, 2018 (AU) .................................. 2018903264

(51) Int. Cl.
*A01K 15/02* (2006.01)
*A01K 11/00* (2006.01)

(52) U.S. Cl.
CPC .......... *A01K 15/023* (2013.01); *A01K 11/008* (2013.01)

(58) Field of Classification Search
CPC ..... A01K 11/00; A01K 11/008; A01K 15/023
See application file for complete search history.

(56) References Cited

U.S. PATENT DOCUMENTS

| 5,408,956 A | 4/1995 | Quigley |
| 5,911,198 A | 6/1999 | Curen |

(Continued)

FOREIGN PATENT DOCUMENTS

| AU | 2017239570 | 4/2018 |
| CH | 712090 | 8/2017 |

(Continued)

OTHER PUBLICATIONS

Extended European Search Report issued in European Patent Application No. 19856660.6, Mar. 10, 2022, 11 pages.

(Continued)

*Primary Examiner* — Kimberly S Berona
*Assistant Examiner* — Katherine June Walter
(74) *Attorney, Agent, or Firm* — Heslin Rothenberg Farley & Mesiti P.C.; Jacquelyn A. Graff, Esq.

(57) ABSTRACT

A method for controlling a stimulus apparatus configured to be worn by an animal, the stimulus apparatus comprising a controller interfaced with a location sensor and at least one stimulus output for providing a stimulus to the animal, the method comprising: receiving a boundary specification and monitoring the location of the stimulus apparatus with respect to the boundary defined by the boundary specification; determining an expanded boundary; identifying a transition condition including a transition zone, the transition zone comprising at least a portion of the expanded boundary; monitoring the location of the stimulus apparatus; determining that the location of the stimulus apparatus is within the transition zone; in response, reducing the size of the boundary such that the boundary includes the transition zone and excludes at least a portion of the boundary before expansion, and associated system and device.

15 Claims, 12 Drawing Sheets

(56) References Cited

U.S. PATENT DOCUMENTS

| | | | |
|---|---|---|---|
| 6,232,880 B1 | 5/2001 | Anderson | |
| 6,581,546 B1 | 6/2003 | Dalland | |
| 7,719,430 B2 | 5/2010 | Lee | |
| 9,848,295 B1 * | 12/2017 | Mason | H04W 4/025 |
| 2013/0008391 A1 | 1/2013 | Berntsen | |
| 2014/0120943 A1 | 5/2014 | Shima | |
| 2014/0352632 A1 | 12/2014 | McLaughlin | |
| 2016/0295833 A1 | 10/2016 | Baize | |
| 2018/0027772 A1 * | 2/2018 | Gordon | A01K 15/023 |
| 2019/0281794 A1 | 9/2019 | Ehrman et al. | |
| 2021/0059213 A1 | 3/2021 | Wooten | |

FOREIGN PATENT DOCUMENTS

| | | | |
|---|---|---|---|
| CN | 108617538 | 10/2018 | |
| FR | 2955672 | 7/2011 | |
| WO | 2000057692 | 10/2000 | |
| WO | WO-2018152593 A1 * | 8/2018 | A01K 11/008 |
| WO | 2019180623 | 9/2019 | |
| WO | 2019180624 | 9/2019 | |
| WO | 2019209712 | 10/2019 | |

OTHER PUBLICATIONS

Office Action and Search Report issued in Norwegian Patent Application No. 20210416, Oct. 1, 2021, 7 pages.

International Search Report and Written Opinion of the International Searching Authority for PCT/AU2019/050927, Sep. 23, 2019, 9 pages.

* cited by examiner

Key
 — Collar 14

Frame A

Frame D

Frame B

Frame E

Frame C

Frame F

Key
● — Collar 14
▒ — Transition Zone

Frame A

Frame E

Frame B

Frame E

Frame C

Frame F

Frame D

Frame G

Key
● — Collar 14
▒ — Transition Zone

SYSTEM AND METHOD FOR CONTROLLING ANIMALS

CROSS REFERENCE TO RELATED APPLICATIONS

This application is a national stage filing under section 371 of International Application No. PCT/AU2019/050927, filed on Sep. 2, 2019, and published on Mar. 12, 2020 as WO 2020/047581, which claims priority to Australian Application No. 2018903264, filed Sep. 4, 2018. The entire contents of each application are incorporated herein by reference in their entireties.

FIELD OF THE INVENTION

The present invention relates to a stimulus apparatus, such as a wearable apparatus, for affixing to an animal, for example a collar that can be worn by the animal, which may be used in a virtual fencing, herding, and/or shepherding system, of particular but by no means exclusive application in controlling livestock such as cattle.

BACKGROUND TO THE INVENTION

In an existing system a virtual fencing system uses battery powered collar units (in some cases supplemented by solar power) attached to the necks of cattle to deliver aversive and non-aversive stimuli to the animal based on its detected location, velocity and heading. The stimuli dissuade the individual animals from moving into particular pre-defined areas of a field or pasture, thereby establishing virtual boundaries that the animals will not or are unlikely to cross.

SUMMARY OF THE INVENTION

According to an aspect of the present invention, there is provided a method for controlling a stimulus apparatus configured to be worn by an animal, the stimulus apparatus comprising a controller interfaced with a location sensor and at least one stimulus output for providing a stimulus to the animal, the method comprising: receiving a boundary specification and monitoring the location of the stimulus apparatus with respect to the boundary defined by the boundary specification; determining an expanded boundary; identifying a transition condition including a transition zone, the transition zone comprising at least a portion of the expanded boundary; monitoring the location of the stimulus apparatus; determining that the location of the stimulus apparatus is within the transition zone; in response, reducing the size of the boundary such that the boundary includes the transition zone and excludes at least a portion of the boundary before expansion.

The method may further comprise the step of applying a stimulus to the animal in response to detecting that the stimulus apparatus is outside of the boundary.

The transition condition optionally further comprises determining that at least one other stimulus apparatus is also located within the transition region. The transition zone may comprise the entire part of the expanded boundary that was not part of the boundary before expansion. The boundary after reduction may be equivalent to the transition zone. The expanded boundary may be equal to the boundary before expansion and the transition zone may constitute an area within the boundary and smaller than the boundary. The method is optionally applied to a plurality of stimulus apparatuses and the transition condition may include identifying the presence of a predetermined number of the stimulus apparatuses within the transition zone.

According to another aspect of the present invention, there is provided a method of changing from a first boundary to a final boundary, comprising the steps of: defining a path between an original boundary and a final boundary, and applying at least one iteration of the method of the previous method, wherein each expansion of the boundary is in the direction along the path of the final boundary.

The stimulus apparatus may be a collar, or the stimulus apparatuses may be collars. The stimulus apparatus or apparatuses may be in wireless data communication with a system controller, the system controller optionally being configured for implementing the method.

According to another aspect of the present invention, there is provided a stimulus apparatus configured to be worn by an animal, the stimulus apparatus comprising a controller interfaced with a location sensor and at least one stimulus output for providing a stimulus to the animal, wherein the controller is configured to cause the stimulus apparatus to: receive a boundary specification and monitor the location of the stimulus apparatus with respect to the boundary defined by the boundary specification; determine an expanded boundary; identify a transition condition including a transition zone, the transition zone comprising at least a portion of the expanded boundary; monitor the location of the stimulus apparatus; determine that the location of the stimulus apparatus is within the transition zone; in response, reduce the size of the boundary such that the boundary includes the transition zone and excludes at least a portion of the boundary before expansion.

According to another aspect of the present invention, there is provided a virtual fencing system comprising a system controller and a plurality of stimulus apparatuses, wherein each stimulus apparatus is in data communication with the system controller, each stimulus apparatus configured to controllably apply a stimulus to an animal wearing the stimulus apparatus in dependence on the location of the stimulus apparatus to a boundary associated with the stimulus apparatus, and the system controller configured to: determine a boundary and communicating the boundary to each stimulus apparatus; determine an expanded boundary, and to communicate the expanded boundary to each stimulus apparatus; identify a transition condition including a transition zone, the transition zone comprising at least a portion of the nonoverlapping boundary portion; monitor the location of each of the stimulus apparatuses; determine that the location of at least one stimulus apparatus is within the transition zone; in response, reduce the size of the boundary such that the boundary includes the transition zone and excludes at least a portion of the boundary before expansion, and communicate the reduced boundary to each of the stimulus apparatuses.

The transition condition may comprise determining that at a predetermined number of the stimulus apparatuses are located within the transition zone. The predetermined number may be equal to the number of stimulus apparatuses. The transition region optionally comprises the entire nonoverlapping portion of the boundary. The boundary after reduction may be equivalent to the transition region. Optionally, after reducing the boundary it includes the entire transition zone only. In another option, after reducing the boundary it excludes the entire boundary before expansion.

According to another aspect of the present invention, there is provided a method for controlling a stimulus apparatus configured to be worn by an animal, the stimulus apparatus comprising a controller interfaced with a location sensor and at least one stimulus output for providing a stimulus to the animal, the method comprising: determining a boundary specification and monitoring the location of the stimulus apparatus with respect to the boundary defined by the boundary specification; receiving new boundary parameters specifying a new boundary; determining a transition comprising one or more transition steps, the transition corresponding from a change to the boundary such that, as a result of the transition, the boundary corresponds to the new boundary; and applying the one or more transition steps; wherein a stimulus is applied to the animal in response to determining that the stimulus apparatus is outside of the boundary at a point during the transition.

Optionally, between each step of the transition the boundary is changed according to a previous method. The boundary may be changed between each step of the transition continuously or smoothly or incrementally over a predetermined period of time.

According to another aspect of the present invention, there is provided a stimulus apparatus configured to be worn by an animal, the stimulus apparatus comprising a controller interfaced with a location sensor and at least one stimulus output for providing a stimulus to the animal, wherein the controller is configured to cause the stimulus apparatus to: determine a boundary specification and monitor the location of the stimulus apparatus with respect to the boundary defined by the boundary specification; receive new boundary parameters specifying a new boundary; determine a transition comprising one or more transition steps, the transition corresponding from a change to the boundary such that, as a result of the transition, the boundary corresponds to the new boundary; and apply the one or more transition steps; wherein a stimulus is applied to the animal in response to determining that the stimulus apparatus is outside of the boundary at a point during the transition.

According to yet another aspect of the present invention, there is provided a method for operating a stimulus apparatus configured to be affixed to an animal, the stimulus apparatus comprising a controller interfaced with a location sensor and at least one stimulus output for providing a stimulus to the animal, the method comprising: receiving, at the stimulus apparatus, boundary parameters defining a first boundary and a second boundary, wherein each boundary is associated with a geographic area; determining, from the boundary parameters, that the first boundary defines an inclusion zone and that the second boundary defines an exclusion zone, and that the first boundary encompasses the second boundary; monitoring the location of the collar with respect to the first and second boundaries; and determining that a stimulus is to be applied to the animal at least in part due to identifying that the animal is located within the exclusion zone; and in response, applying the stimulus.

The stimulus apparatus may be a collar configured to be worn around the neck of an animal. The stimulus may comprise an aversive stimulus and/or non-aversive stimulus. Optionally, the boundary parameters specify that the first boundary defines an inclusion zone and that the second boundary defines an exclusion zone. The controller may be configured to determine that the second boundary defines an exclusion zone based on it being encompassed by the first boundary. The method optionally further comprises the step of ceasing applying the stimulus upon identifying that the animal is located within the inclusion zone. The boundary parameters may be received from a system controller via a wireless data communication.

According to still yet another aspect of the present invention, there is provided a stimulus apparatus configured to be affixed to an animal, the stimulus apparatus comprising a controller interfaced with a location sensor and at least one stimulus output for providing a stimulus to the animal, the controller configured to cause the stimulus apparatus to: receive boundary parameters defining a first boundary and a second boundary, wherein each boundary is associated with a geographic area; determine, from the boundary parameters, that the first boundary defines an inclusion zone and that the second boundary defines an exclusion zone, and that the first boundary encompasses the second boundary; monitor the location of the collar with respect to the first and second boundaries; and determine that a stimulus is to be applied to the animal at least in part due to identifying that the animal is located within the exclusion zone; and in response, apply the stimulus.

The stimulus apparatus may be a collar configured to be worn around the neck of an animal. The stimulus comprises an aversive stimulus and/or non-aversive stimulus. Optionally, the boundary parameters specify that the first boundary defines an inclusion zone and that the second boundary defines an exclusion zone. The controller may be configured to determine that the second boundary defines an exclusion zone based on it being encompassed by the first boundary. The controller is optionally configured to not apply the stimulus upon identifying that the animal is located within the inclusion zone. The boundary parameters may be received from a system controller via a wireless data communication.

As used herein, the word "comprise" or variations such as "comprises" or "comprising" is used in an inclusive sense, i.e. to specify the presence of the stated features but not to preclude the presence or addition of further features in various embodiments of the invention.

BRIEF DESCRIPTION OF THE DRAWINGS

In order that the invention may be more clearly understood, embodiments will now be described, by way of example, with reference to the accompanying drawing, in which.

DESCRIPTION OF EMBODIMENTS

Figure 1:
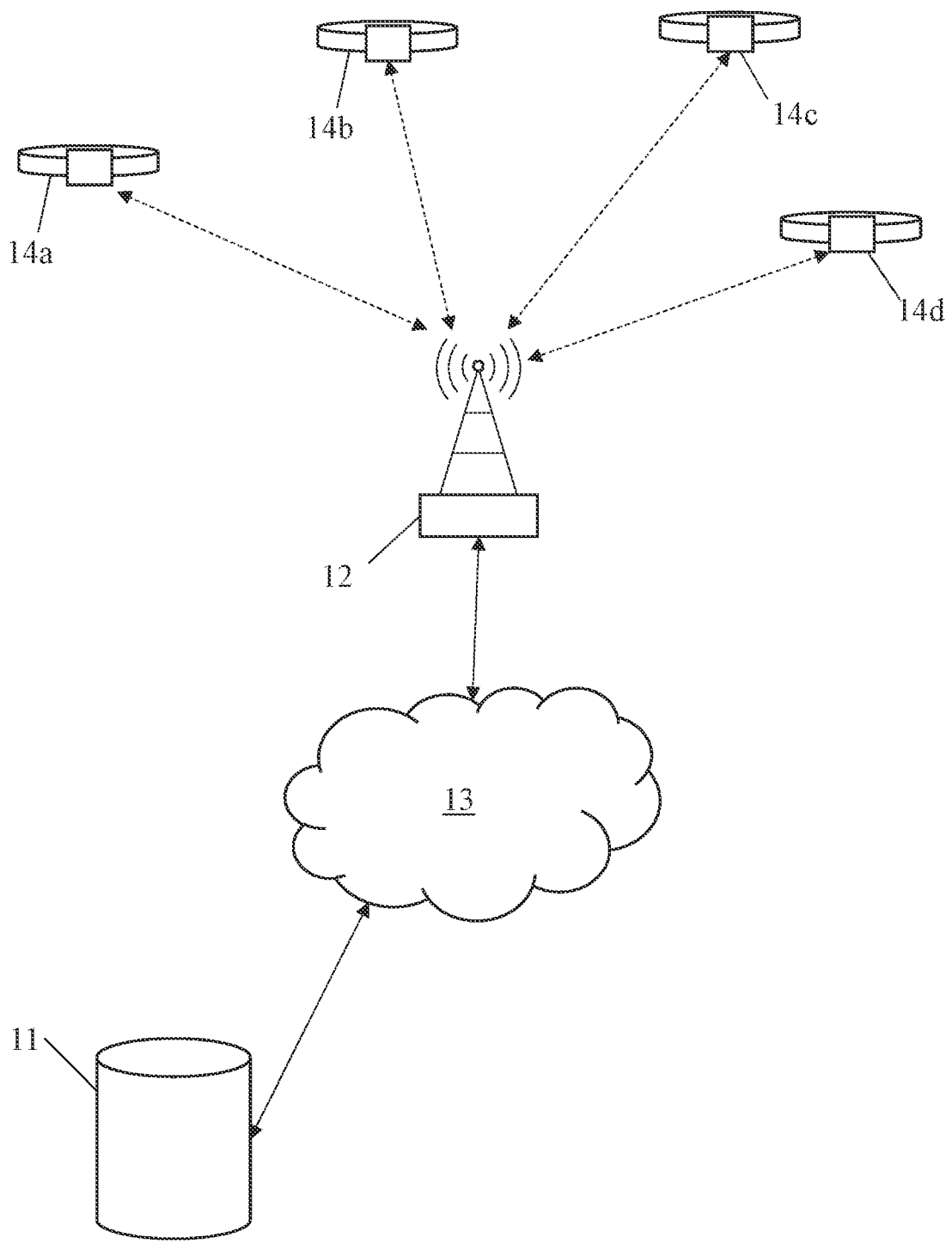
FIG. 1 shows a virtual boundary system according to an illustrative embodiment.

A virtual boundary system 10 is shown schematically in FIG. 1. The virtual boundary system 10 may be known as a "virtual fencing system", "virtual herding system", "virtual shepherding system", or "virtual paddock system".

The system 10 comprises a base station 12, and one or more stimulus apparatuses 14 (in the embodiments described herein, the stimulus apparatuses are collars 14). The collars 14 are generally designed to be wearable by an animal. For example, for the embodiments herein described, the collars 14 are configured to be worn by a specific domesticated animal, in this example cattle. FIG. 1 depicts four such collars 14a, 14b, 14c, 14d for the purpose of illustrating the described embodiments, however more generally the actual number of collars either provided or deployed with system 10 can be selected as desired. Generally, the stimulus apparatuses 14 may be of any suitable type—for example, this may depend at least in part on the type of animal. A system controller 11 is provided in network communication with the base station 12 via a network 13.

Generally, the stimulus apparatus 14 should be affixable to an animal, for example, the apparatus may be worn by the animal, may be implanted, or any other suitable means for affixing. The stimulus apparatus 14 can be affixed, for example, to the neck, torso, head, ear, tail, or any other part of the animal which may be suitable for implementing the functionality herein described. The particular location on the animal of the stimulus apparatus 14 may depend on the type of animal. The stimulus apparatus can include a plurality of components located at different locations on the animal.

Applicant's earlier PCT application no. PCT/AU2018/050168 describes a virtual fencing system, features of which may be utilised as part of the system 10, and the disclosure of this application is incorporated herein in its entirety.

Figure 2:
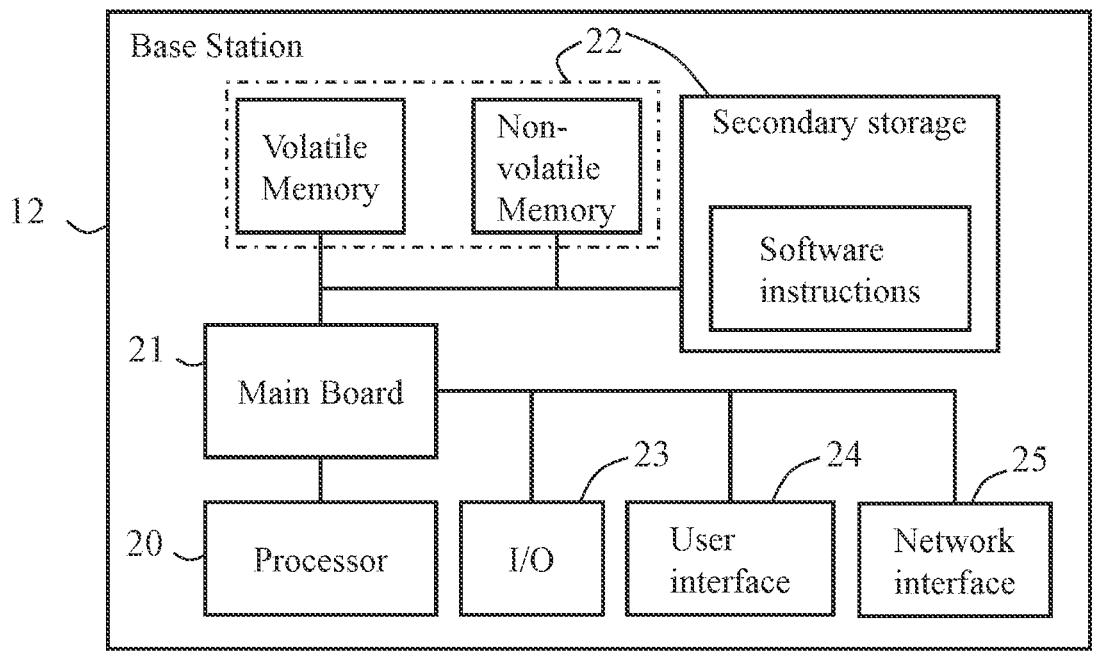
FIG. 2 shows a schematic representation of components of a base station according to an embodiment.

Referring to FIG. 2, base station 12 includes a processor 20 mounted on a circuit board 21. Base station 12 includes memory 22 in the form of volatile memory (e.g. RAM) and/or non-volatile memory (e.g. a mass storage memory such as FLASH and/or magnetic hard drive, and/or a ROM or EEPROM). The memory 22 is interfaced with processor 20. Instructions and data to control operation of processor 20 are stored in the memory 22; these include software instructions stored in the non-volatile memory which, when executed by processor 20, implement each of the processes carried out by base station 12, and which may be copied by base station 12 to volatile memory for execution, when required.

Base station 12 also includes an input/output (I/O) interface 23 for communicating with peripheral devices of system 10. These peripheral devices include a user interface 24 of base station 12. User interface 24 may be a part of base station 12, but in practice user interface 24—which commonly comprises a keyboard, one or more displays (which may be touch screen displays) and/or a mouse—may be integral with base station 12, such as if base station 12 is provided as a portable computing device, or provided as a separate component or components, such as if base station 12 is provided as a computer, such as a personal computer or other desktop computing device. In this case, the peripheral devices (e.g. user interface 24) may be remotely located with respect to the base station 12. Typically, the base station 12 comprises a network interface 25 for communication with the network 13 (which can comprise a mobile data network such as a 3G or 4G network, a satellite data network, and/or a customised intranet). The network 13 may include the Internet.

System 10 also includes a wireless telecommunications network (represented as broken lines connecting base station 12 and collars 14 in FIG. 1) to facilitate communication between base station 12 and collars 14. In this embodiment, the wireless telecommunications network is in the form of a LoRa (trade mark) LPWAN (Low Power Wide Area Network), or an alternative LPWAN such as a SIGFOX (trade mark) LPWAN or an Ingenu (trade mark) RPMA (Random Phase Multiple Access) LPWAN, WiFi (in particular, directed WiFi), NB-IoT, or any other suitable wireless technology. Generally, the network interface 25 is configured to communicate with the collars 14 via the wireless telecommunications network. In this embodiment, the LoRa LPWAN (as would be the case with other LPWANs) employs a transmitter (not shown) in each of collars 14 and a gateway (not shown) provided with a multi-channel receiver or receivers for facilitating communication with the transmitters. These elements may be regarded as a part of system 10, or as external to but cooperating with system 10. The LoRa LPWAN also employs a telecommunications connection between the gateway and base station 12; this telecommunications connection is in the form, in this embodiment, of a cellular connection to a mobile telephony network or an Ethernet connection, back to a router (not shown) of base station 12. The network interface 25 can also be configured to communicate with the system controller 11, in applicable embodiments.

In some applications, the farm or other property may be too large for convenient use of this arrangement. This may be so with larger properties of, for example, greater than for 6,000 Ha. In such cases, one or more additional gateways may be required and sufficient (if, for example, there is good cellular coverage on the property) or repeaters where an internet connection is limited.

Base station 12 is operable to send command signals to each of collars 14 (using the LoRa LPWAN discussed above) and, typically, to receive data from collars 14 on the status, behaviour, etc., of the animals and the operation of collars 14. Base station 12 can also be operated to create and control the virtual fence, including the specification of the location of each section of the virtual fence and of the stimuli to be applied to the animals. The virtual fence and stimuli specifications are transmitted by base station 12 to the collars 14 whenever established or modified, for use by the respective collar's virtual fence controller (described below).

Figure 3:
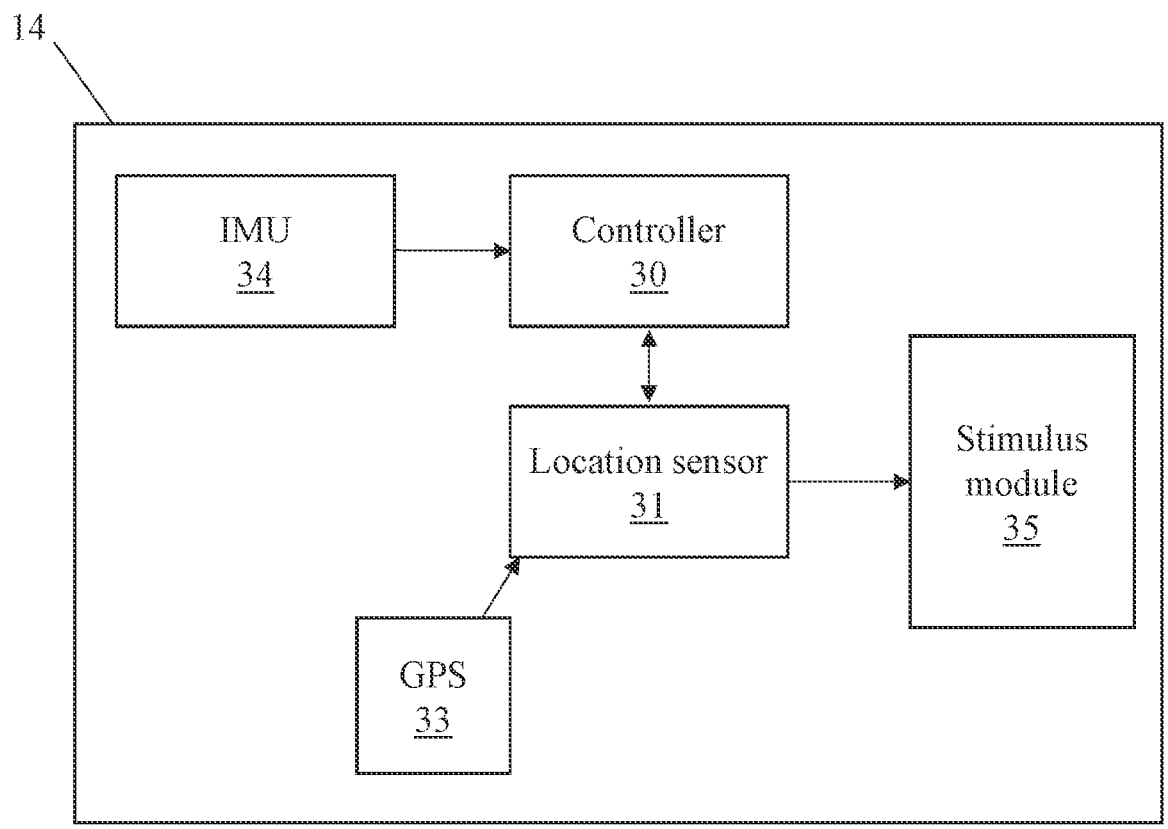
FIG. 3 shows a schematic representation of components of a collar according to an embodiment.

Certain principal operational components of each collar 14 are shown schematically in more detail in FIG. 3. It should be appreciated that certain of the illustrated components may be provided—as convenient or when found to be technically preferable—in either collars 14 or base station 12.

Referring to FIG. 3, a collar 14 includes a controller 30 interfaced with a location sensor 31. The location sensor 31 is configured to enable the controller 30 to determine a location of the collar 14, for example an absolute location or a relative location with respect to one or more reference points. The collar 14 typically will include an inertial motion unit (IMU) 34. In the embodiment of FIG. 3, a 9-axis inertial motion unit (9DOF IMU) 34 is interfaced with the controller 30. The IMU 34 in this embodiment comprises a 3-axis accelerometer, a magnetometer, and a gyroscope. In another embodiment, a 6-axis inertial motion unit is utilised comprising a 3-axis accelerometer and a 3-axis magnetometer. Although the described embodiment does not include a velocity sensor as such (with velocity being calculated from acceleration), in an alternative embodiment a velocity sensor can be incorporated. In an embodiment, the collar 14 is configured to obtain at least 3-axis acceleration measurements.

According to the embodiment shown in FIG. 3, the location sensor 31 comprises a GPS receiver 33. Alternatives include utilising the Global Navigation Satellite System (GNSS) or a Bluetooth based mesh proximity between collars 14. Additionally, the location sensor 31 makes use of the IMU 34 such that the location of the collar 14 can be determined between measurements made by the GPS receiver 33. Advantageously, this can reduce the usage of the GPS receiver 33.

Each collar 14 also includes a power supply (in the present example, comprising a battery pack (not shown) and a solar panel (not shown)), and at least one stimulus output for providing a stimulus to the animal selected from: an audio output (not shown) for emitting an audio stimulus; and one or more stimulus electrode(s) (not shown) for applying selected stimuli to the animal. The battery pack and solar panel provide electrical power for powering the respective collar 14 and its electrodes. The solar panels also charge the battery pack, but directly power the respective collar 14 and its electrodes whenever there is sufficient insolation; this is managed by a power manager (described below). Collars 14 may optionally include other sensors as desired (not shown). For example, in an embodiment, the collar 14 further comprises a temperature sensor. In another example, an embodiment of the collar 14 further comprises an ambient light sensor.

Suitable collars 14 are described in previously referenced PCT application number PCT/AU2018/050168.

In an embodiment, the controller 30 is arranged to utilise current location data and optionally motion data in order to determine whether the stimulus electrodes should be activated to apply stimulus to the animal and—if so—the type of stimulus. The determination is made in accordance with virtual boundary specifications and stimuli specifications (received from base station 12)—these specifications are described in greater detail below. This determination may be performed according to any suitable (typically pre-defined) stimulus algorithm that determines what stimulus is applied and when it is applied, and is processed in real-time in collar 14 by controller 30 (real-time meaning within a timeframe suitable for controlling the animal according to the implementation). Controller 30 then controls the stimulus module 35 to cause the appropriate stimulus to be applied. For the purposes of this disclosure, the appropriate stimulus can be determined by the controller 30 and can include applying an audio stimulus, an electrical stimulus, or in certain circumstance, both an audio and an electrical stimulus.

Generally, it is expected that the controller 30 implements a suitable method that satisfies the requirement for managing the location of the animal to which the collar 14 is affixed. The boundary specifications typically define at least one inclusion zone and at least one exclusion zone—the collars 14 are configured to operate such as to prevent an animal entering an exclusion zone, although the operation of the collars 14 may be subject to constraints such that a collar 14 will not necessarily apply a stimulus simply because an animal is in the exclusion zone. For example, there may be situations where a stimulus is not applied, such as when an animal is stressed or startled. Generally, the boundary specifications enable the collars 14 to determine whether to apply a stimulus based on the location of the collar 14 relative to an exclusion zone or inclusion zone.

System Controller

Figure 4:
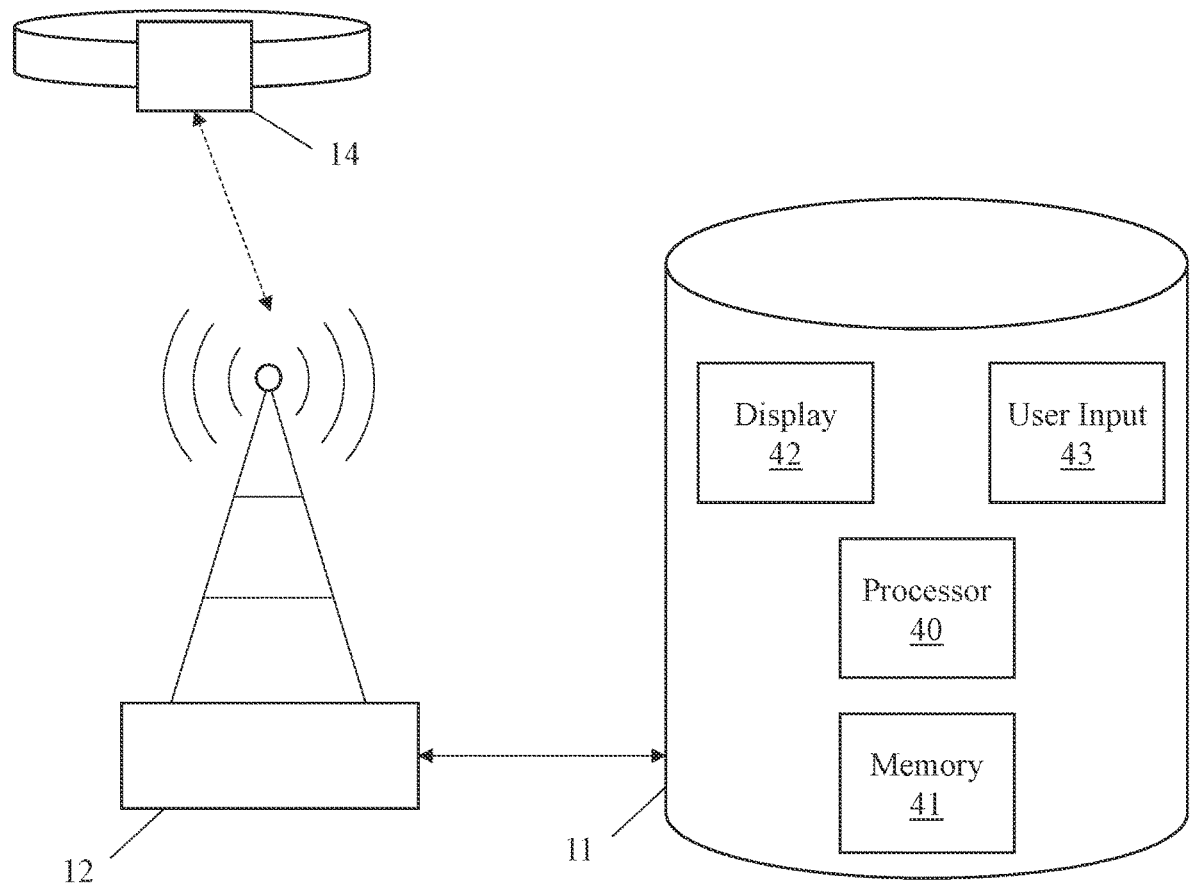
FIG. 4 shows a schematic representation of components of a system controller and the interaction with a base station and a collar.

FIG. 4 shows a simplified arrangement wherein the system controller 11 communicates with the base station 12 (the communication is shown as direct communication for convenience). In turn, the base station 12 communicates with a single collar 14. The communication is shown as two-way in each case; however, in an alternative, the collars 14 in particular may be configured to only receive data.

The system controller 11 can be implemented in a number of different hardware configurations, as required. Generally, the system controller 11 is implemented within a computing device comprising one or more processors 40 interfaced with a memory 41 (again, typically comprising a volatile and a non-volatile memory) and a display 42. The processor(s) 40 are also interfaced with a user interface 43 which, for example, enables a user of the system controller 11 to provide inputs which are processed and actioned by the processor 40. The user interface 43 can comprise known user inputs such as a keyboard, a mouse, a touchscreen (in which case the display 42 can also be part of the user interface 43), or any other suitable input.

In an embodiment, the system controller 11 is directly interfaced with the user interface 43; for example, the system controller 11 may be implemented within a server system, and the user interface 43 comprises a display 42 and a keyboard and mouse. The server system can comprise a single computer or a plurality of networked computers. In another embodiment, the system controller 11 is implemented in a server system and the user interface 53 is provided by a client computer in network communication with the system controller 11 (optionally via the Internet). In yet another embodiment, the system controller 11 is implemented within a cloud server architecture (for example, Amazon Web Services™), again controllable from a client computer in network communication with the system controller 11.

Setting Boundaries

Figure 5:
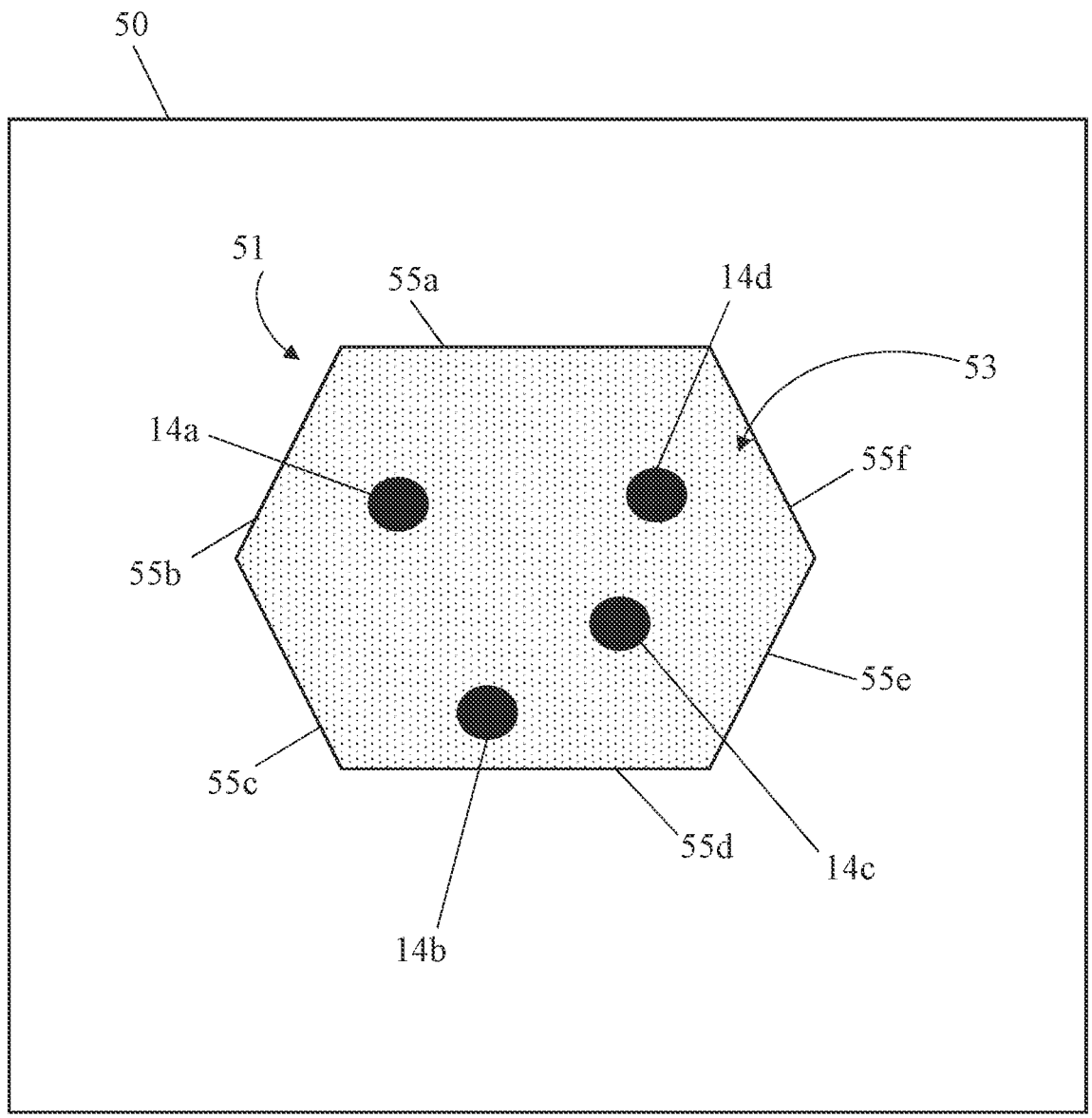
FIG. 5 shows an example of a boundary represented on a display with collars also displayed.

Referring to FIG. 5, the system controller 11 is configured to enable a user to provide input specifying a boundary 51 (in FIG. 5, the boundary 51 is composed of six boundary segments 55a, 55b, 55c, 55d, 55e, 55f) of the virtual boundary system 10. A boundary 51 is converted into boundary parameters for communication to a collar 14. For the purposes of this disclosure, unless otherwise stated, the term "boundary" is used as a metonym for "virtual fence". It is assumed for the remainder of the disclosure that the system controller 11 is configured to require the user to confirm (or finalise) newly specified boundaries 51 before these are communicated to the collars 14. However, an alternative embodiment is envisaged wherein the act of specifying a boundary automatically results in the collars 14 being updated.

FIG. 5 shows an example of a map 50 (shown as a square border) displayed on the display 42 (the display 42 is not shown). The map 50 corresponds to a region of land in which the collars 14 are located and therefore where the animals wearing the collars 14 are located. The system controller 11 is configured to cause the map 50 to be displayed on the display 42 when instructed to do so (e.g. as a result of an input by a user via the user interface 43). The map 50 is typically an interactive map, in that the user is enabled, via the user interface 43, to manipulate the map 50 (e.g. translation of the map 50, zoom in/out of the map 50, etc.).

Each collar 14 is configured to communicate on occasion (e.g. periodically or in response to a request communicated to the collar 14 from the base station 12 or system controller 11) location information indicating the location of the collar 14 to the base station 12, which is in turn configured to communicate the received location information (along with a collar ID identifying the particular collar 14 associated with the location information) to the system controller 11.

Thus, according to this embodiment, the system controller 11 can be configured to display on the map 50 the location of the collars 14 which are presently located within the same region of land as represented by the current map 50.

The user is enabled to set a boundary 51 by interacting with the user interface 43. The user interface 43 may provide for the user to set a straight line by clicking at two positions on the map 50 as per boundary segments 55 and/or a touch screen interface enables the user to define the boundary segments 55 through a touch action.

In an embodiment, the user is limited to defining boundary segments 55 as straight lines. In another embodiment, the user is enabled to set any desired boundary shape for the boundary 51, including for example, both straight lines and curved lines. It may be preferred that the boundaries 51 be defined by a relatively small number of parameters (e.g. two map points for a straight line, a curvature for a segment of a circle, etc.), as this tends to result in fewer data points when defining the boundary 51 for example when compared to a boundary having a free-form definition. However, it is envisaged that an embodiment may allow the user to set the boundary shape using a "free-form" input, such as achieved by "drawing" the boundary 51 on the screen. The boundary 51 is typically displayed on the display 42 as an overlay on map 50. Some possible boundary segment geometries include straight lines, segments (of a circle or ellipse), jagged, etc. In an embodiment, the system controller 11 requires that each boundary segment 51 after the first boundary segment 55a must begin at the end of a previously set boundary segment 55. Additionally, the system controller 11 may require that a boundary 51 is complete only once each end of each boundary segment 55 is connected to an end of another boundary segment 55.

In an embodiment, the user is enabled to specify, via the user interface 43, only straight-line boundary segments 55. In another embodiment, the user may be enabled to set non-straight-line boundary segments 55, with the system controller 11 then configured to convert the non-straight-line boundary segments 55 into a series of straight-line boundary segments 55 approximating the non-straight-line boundary segment 55.

The boundary 51 when considered as a whole (i.e. the combination of boundary segments 55) defines an enclosed space 53 which is defined by the space enclosed by the connected boundary segments 55 (in the specific example, the connected boundary segments 55a, 55b, 55c, 55d, 55e, 55f). In this embodiment, the enclosed space 53 corresponds to an inclusion zone, which is indicated by shading. The region of the map 50 outside of the boundary 51 corresponds to an exclusion zone, which is indicated by the absence of shading. In an embodiment, the user is enabled to set whether the enclosed space 53 of a particular boundary 51 defines an inclusion zone or an exclusion zone.

The embodiments described herein utilise boundaries 51 which completely enclose an enclosed space 53, this is not intended to be limiting. In an embodiment, each boundary segment 55 has an inclusion side and exclusion side, which operate similarly to the inclusion and exclusion zones. A natural terrain feature may be relied upon to provide a boundary segment 55.

Generally, the virtual fence specification communicated to a collar 14 comprises necessary information for the collar 14 to compute locations corresponding to inclusion zones and locations corresponding to exclusions zones. From this, the collar 14 can be operated to apply a stimulus where appropriate.

In an embodiment, the system controller 11 is configured to enforce a minimum and/or maximum angle requirement. corresponding minimum angle requirement corresponds to a smallest allowable angle between two connected boundary segments 55. The system controller 11 may enforce the minimum angle by not allowing a new boundary segment 55 to be set where the internal angle between it and the boundary segment 55 to which it will be attached is less than the minimum angle.

In an embodiment, the system controller 11 is configured to enforce constraints on the placement of boundary segments 55. The system controller 11 can be preconfigured (for example, by a user or a system installer) with locations which cannot comprise an inclusion zone and/or over which a boundary segment 55 cannot extend. Such locations may correspond to physical features, for example, dams, physical fences, gullies, rivers, etc. For example, a permanent exclusion zone may be set around such features. A permanent exclusion zone can be considered an exclusion zone that cannot be changed or cannot be changed as easily as a normal exclusion zone (for example, only users with particular authorised access to the system controller 11 may be enabled to change permanent exclusion zones). The map 50 may be configured to show such features with a visual indication that they correspond to permanent exclusion zones.

Nested Boundaries

Figure 6A:
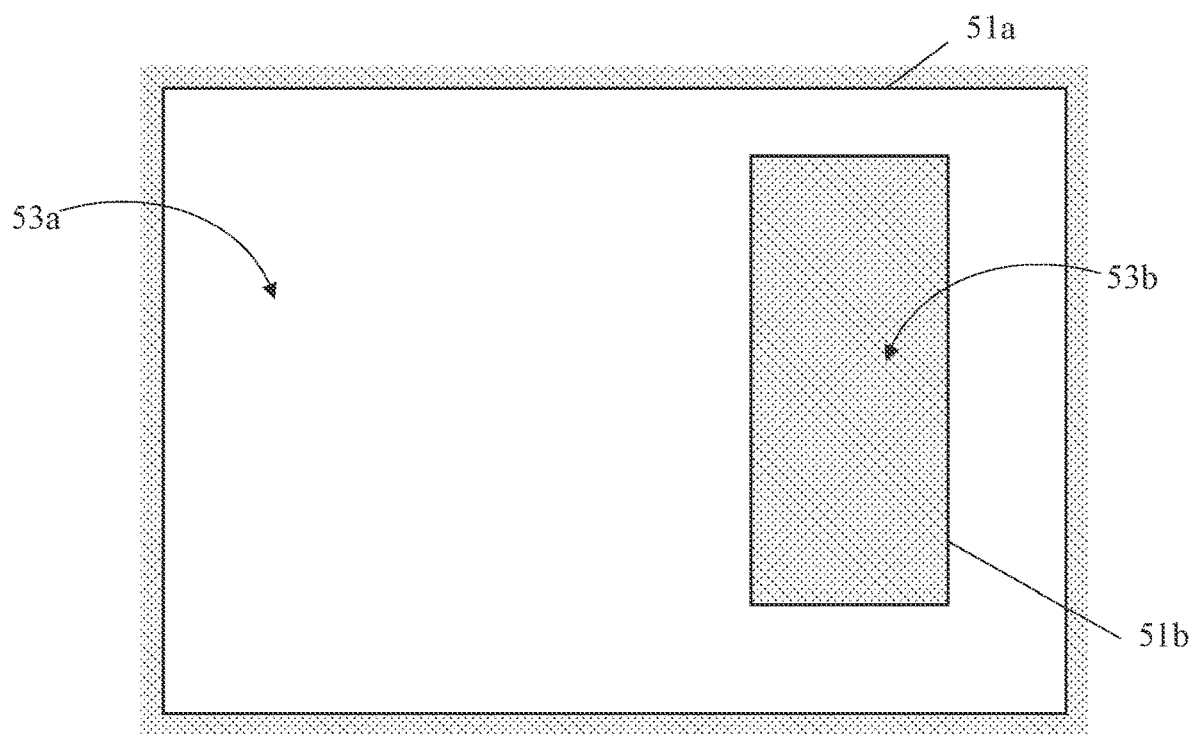
FIG. 6a shows an example of an exclusion zone within an inclusion zone.
Figure 6B:
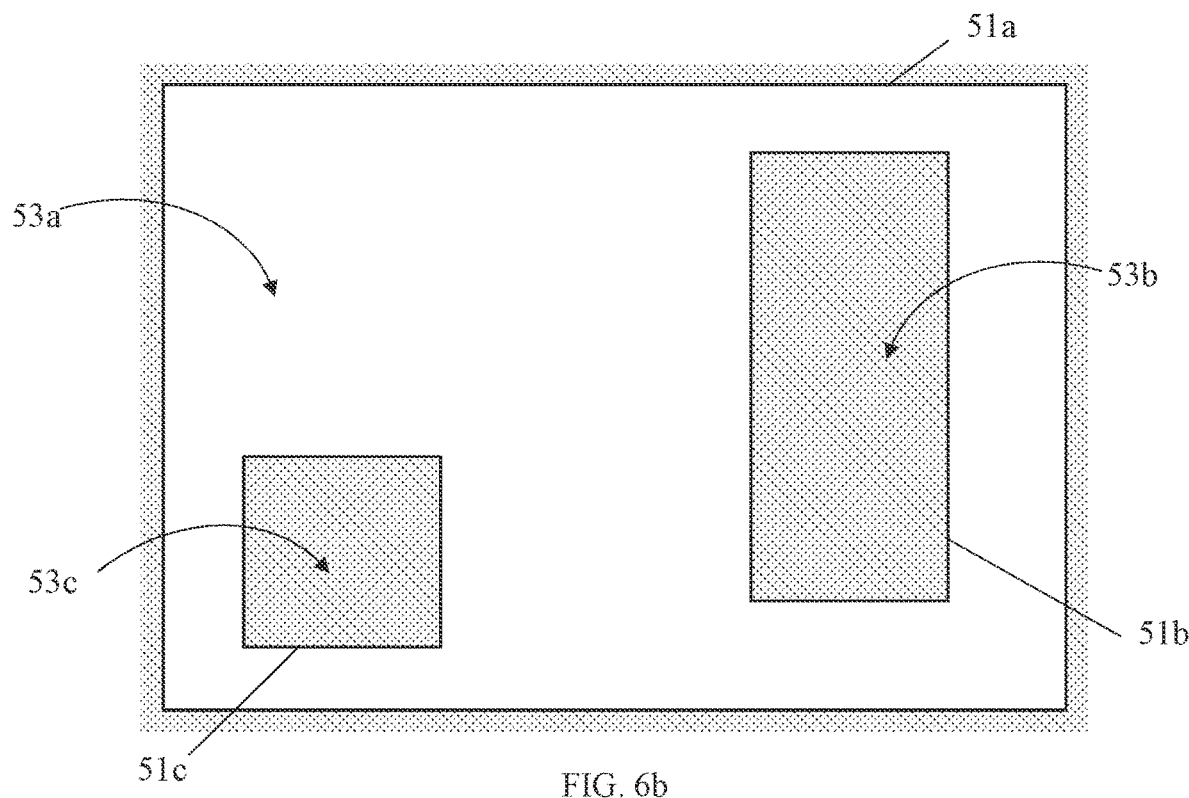
FIG. 6b shows an example of two exclusion zones within an inclusion zone.

FIGS. 6a and 6b show an embodiment including the ability to create nested boundaries 51. In the embodiment of FIG. 6a, a first boundary 51a entirely encompasses a second boundary 51b. However, the enclosed space 53a of the first boundary 51a and the enclosed space 53b of the second boundary 51b do not both correspond to inclusion zones. Instead, the first enclosed space 53a is set as an inclusion zone and the second enclosed space 53b is set as an exclusion zone. In FIG. 6b, there are three boundaries 51a, 51b, and 51c. The first enclosed space 53a is set as an inclusion zone, the second and third enclosed spaces 53b and 53c are set as exclusion zones. In FIG. 6b, the second and third boundaries 51b and 51c do not overlap. Note that in both figures, an "exclusion zone" is effectively shown surrounding the inclusion zone of the outer boundary 51a—this represents that animals should not move outside of the outer boundary 51a.

Generally, it is expected that many configurations may be employed of multiple boundaries 51, which may include multiple "levels" of nesting—e.g. a first boundary 51a encompassing a second boundary 51b itself encompassing a third boundary 51c. It may be required that the enclosed space 53 of an outermost boundary 51 must define an inclusion zone (as effectively the area outside of the outermost boundary 51 is an exclusion zone). According to this embodiment, the user is enabled to set the enclosed space 53 for a particular boundary 51 as either corresponding to an exclusion zone or an inclusion zone. Generally, if two boundaries 51 defining the same zones include abutting segments, then the two boundaries can be considered a single boundary 51.

The system controller 11 is configured to communicate boundary parameters to the collars 14 such that the collars 14 are enabled to determine the actual location on the terrain corresponding to the inclusion zones and the exclusion zones. That is, the collars 14 are provided with information specifying each of the boundaries 51, which is stored in the memory of the controllers 30 of the collars 14. Additionally, the collars 14 are provided with information effectively indicating on which side of each boundary 51 its animal is intended to be present on (the locations on the terrain corresponding to inclusion zones). In an embodiment, each boundary 51 comprises a plurality of straight-line boundary segments 55 which together define an enclosed space 53. The positions of the two ends of each boundary segment 55 are communicated to the collars 14.

The user may be enabled to select an ordering of the various boundaries 51 such as to define which boundary 51 takes precedence with two or more boundaries 51 enclose the same area. For example, in FIG. 6a, the user can be enabled to select the second boundary 53b as taking precedence over first boundary 53a. The system controller 11 may also, or alternatively, be configured to assume that a boundary 51 encompassed by another boundary 51 is to take precedence.

Transitions Between Boundaries

According to an embodiment, with reference to FIGS. 7a to 7f, a transition is provided between a current (or "initial") boundary 71 and a new boundary 72. In the example shown, the new boundary 72 defines an entirely different geographic area to the current boundary 71 (although, generally, there may be overlapping portions of the current and new boundaries 71, 72). The transition comprises one or more changes ("steps") to the boundary 71 starting with the current boundary 71 to ultimately correspond to the area defined by the new boundary 52. The effect is to move the animal(s) (associated with each of the collar(s) 14) from being located within the area defined by the current boundary 71 to the area defined by the new boundary 72. For the purposes of the disclosure, it will be assumed that there are a plurality of animals and therefore collars 14 (the figures show the location of four collars 14), however, the method is applicable to a single collar 14 and animal.

Figure 7A:
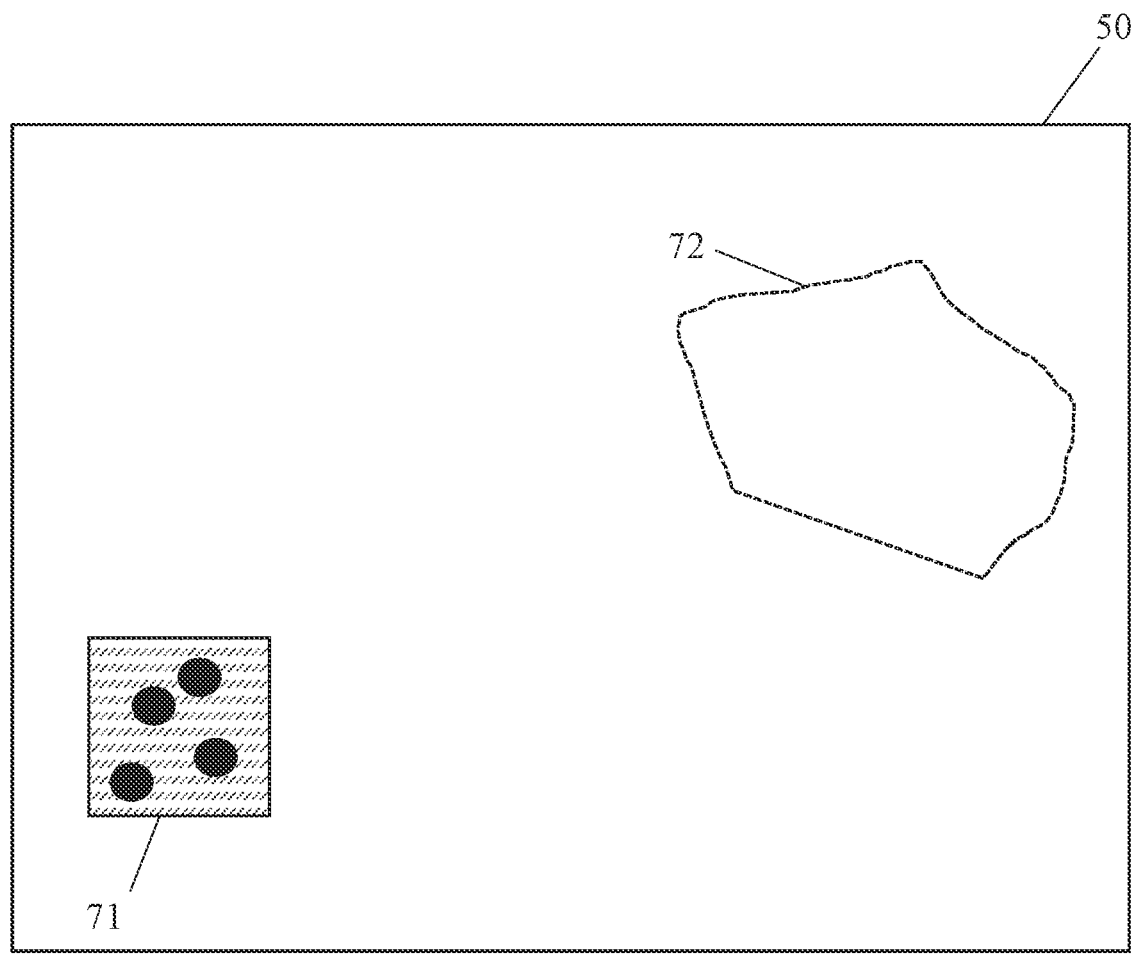
FIG. 7a shows an original boundary and a new boundary, with collars present within the initial boundary.
Figure 7A:
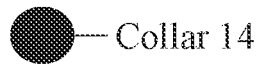

FIG. 7a illustrates an example of an existing current boundary 71 and desired new boundary 72 within an area shown on a map 50. As can be seen, the geometries of the current and final boundaries 71, 72 can differ. The collars 14 (and by extension, the animals) are shown within the current boundary 71.

Figure 7B:
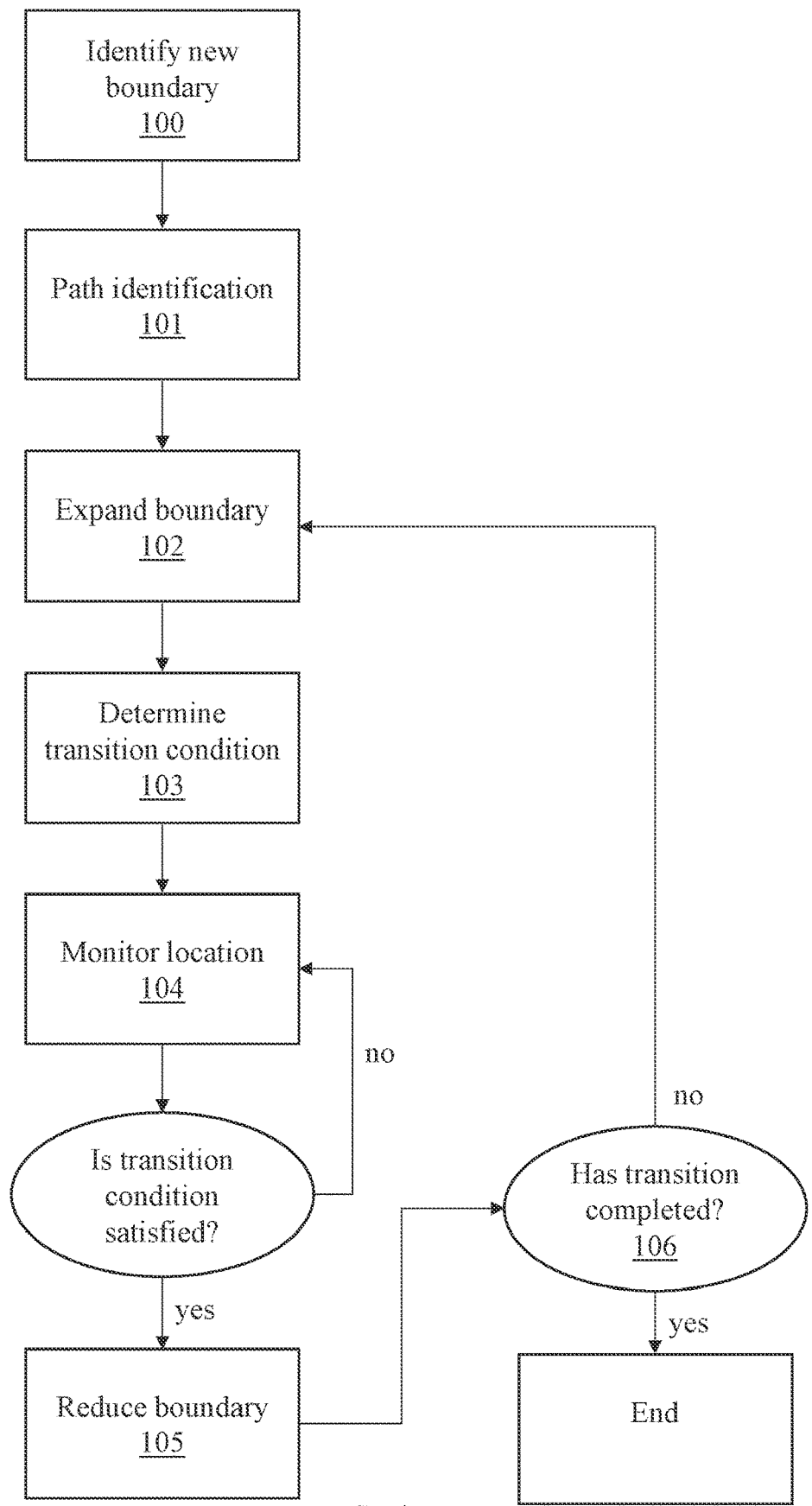
FIG. 7b shows a method for moving the collars from the original boundary to the new boundary.
Figure 7C:
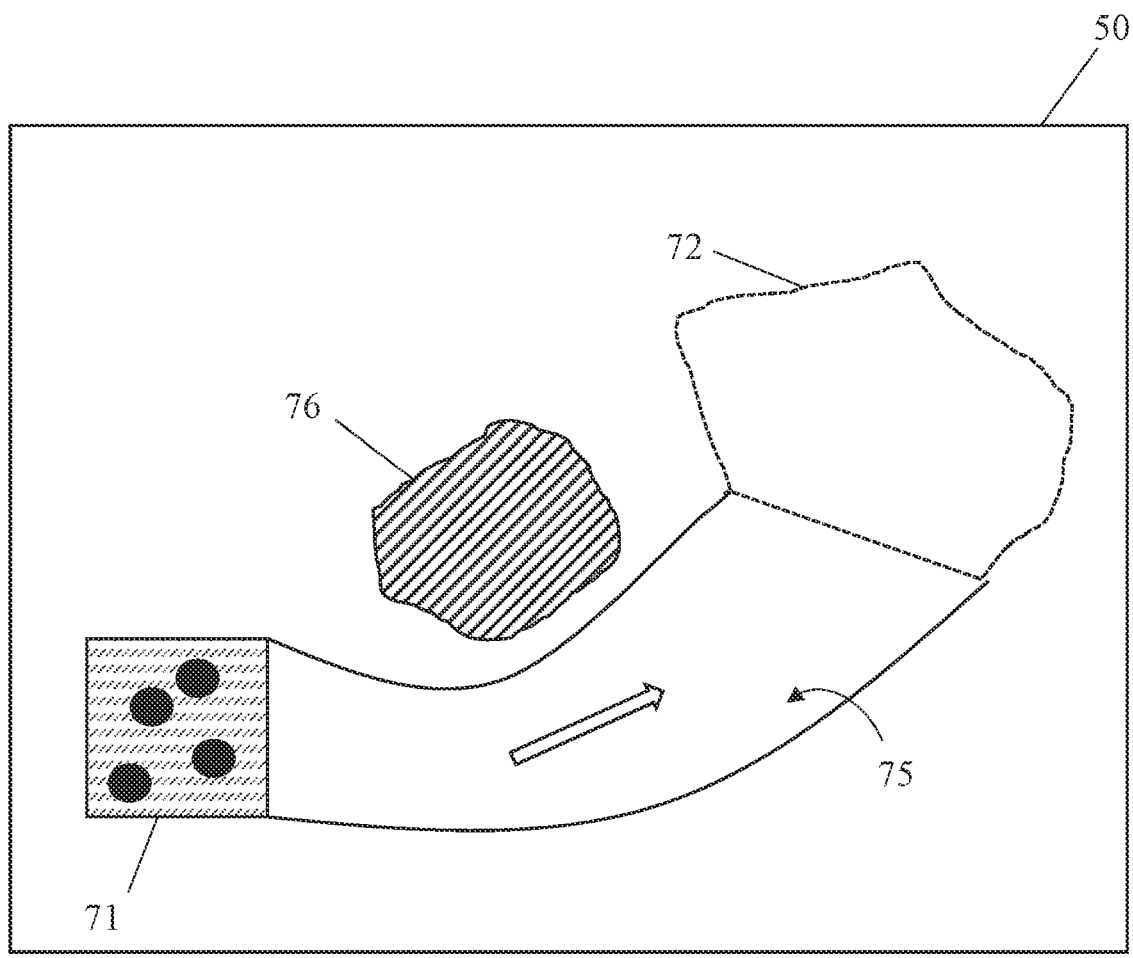
FIG. 7c shows a path for transitioning between a current boundary and a new boundary.
Figure 7C:
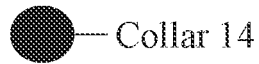

FIG. 7b shows a method for effecting the transition. As a first step 100, the new boundary 72 is identified. In the present example, the user will set the new boundary 72. With reference to FIG. 7c, the system controller 11 may then be configured to identify a path 75 that can connect the current boundary 71 to the new boundary 72, at path identification step 101.

FIG. 7c shows a path 75 linking the current boundary 71 with new boundary 72. The path 75 may be identified at least in part by a user interaction via the user interface 43. For example, the user may define the path 75 in its entirety. In another example, the system controller 11 is configured to identify a suitable path 75. In this example, the user may be enabled to define parts of the map 50 which must and/or must not be encompassed by the path 75 (e.g. the user may indicate that a region corresponding to a barrier such as a river, tree, or rock is not to be part of path 75). The system controller 11 can also be preconfigured with geographical regions which cannot include the path 75, for example, previously described permanent exclusion zone(s). The user may be enabled to modify the path 75 determined by the system controller 11. The example shown in FIG. 7c shows a map 50 having a permanent exclusion zone 76, a current boundary 71, and a new boundary 72. A path 75 has been determined which avoids the permanent exclusion zone and links the current boundary 71 and a new boundary 72. The path 75 can have been automatically determined, set by a user, or a combination of the two. Generally, the path 75 is associated with a direction (indicated by the arrow), where the direction indicates movement from the current boundary 71 to the new boundary 72. The example also illustrates a change in geometry between the current boundary 71 and the new boundary 72.

The boundary 71 is then expanded along the path in the direction of the new boundary 72, at expansion step 102. After expansion, the boundary 71 may be referred to as an expanded boundary 71. The boundary 71 can be expanded by a predetermined amount. For example, the boundary 71 may expand by an equal (or roughly equal) amount for each step of the transition. Alternatively, the system controller 11 can select an expansion size based on relevant factors, such as a required speed of transition. In an embodiment, the current boundary 71 is expanded such that the expanded boundary 71 entirely encompasses the new boundary 72, the original position of the current boundary 71, and where applicable, any intervening area (such as that defined by the path 75). As a result of the expansion, the animals have a larger area in which they can move before the associated collars 14 are activated. In some instances, the expanded boundary 71 may in fact be the same as the boundary 71 before expansion (such as when the boundary 71 is being reduced in size but not moving). For the purposes of this disclosure, the step of expanding the boundary 71 should include the boundary 71 staying the same size, unless otherwise stated.

Next, a transition condition is determined at condition determination step 103. According to the present embodiment, the transition condition includes a transition zone, corresponding to a geographic location within the expanded boundary 71. The transition zone may be wholly contained within the expanded boundary 71 and is typically smaller than the expanded boundary 71. The transition zone may include the entire expanded portion of the boundary 71. The transition zone may also comprise a portion of the original portion of the boundary 71. In an embodiment, the transition zone is located such that the entire expanded region is encompassed by the transition zone.

Although the embodiment described utilises a transition zone corresponding to a geographic area, the transition condition can take other forms. For example, the transition condition may be expressed as a distance within an edge of the expanded boundary 71 (the edge being closer along the path to the final boundary 72 than other points within the expanded boundary 71). In another example, the transition condition may be expressed as a distance from an edge of the expanded boundary 71 (the edge being further along the path to the final boundary 72 than other points within the expanded boundary 71).

The transition condition also includes a transition rule comprising a predetermined number of the collars 14 (for example, in the embodiment shown in FIG. 7c, all of the collars 14) being present within the transition zone. In another embodiment, the predetermined number of collars 14 may be fewer than the total number of collars 14. For example, the predetermined number of collars 14 may correspond to a selected percentage of the total number of collars 14.

The location of the collar(s) 14 is monitored in order to determine that the transition condition has been satisfied, at monitoring step 104. For example, each of the collars 14 are required to be present within the transition zone to satisfy the transition condition.

In response, the boundary 71 is reduced in size such that it corresponds to the same geographic area as the transition zone, at boundary reduction step 105. In this way, the boundary 71 is effectively moved along the path. In one embodiment, as the transition condition requires that all the animals are within its associated geographic area, no animal is made to be outside of the boundary 71 (i.e. within an exclusion zone) as a result of the movement of the boundary 71. In another embodiment, a certain percentage of animals may be left outside of the reduced boundary 71—this might be applicable to animals showing herding behaviour as the application of a stimulus is likely to cause the animal to move closer to the bulk of the herd. It may be preferred that the transition condition requires a majority of the collars 14 to be present within the transition zone before the boundary 71 is reduced in size.

In an embodiment, the boundary 71 is reduced over a predetermined period of time. The reduction may be reduced continuously, for example smoothly, or incrementally over the predetermined period.

In an embodiment, the transition condition does not include a transition zone—the current locations of the collars 14 are not utilised when determining the transition. For example, the transition condition can correspond to a predetermined time only and may in fact be instantaneous. This embodiment may be useful where animal behaviour indicates that the animals will naturally enter the new boundary area 72 when a stimulus is applied. For example, when moving grazing animals from one paddock to another, the animals may naturally move towards the new paddock having more feeding options.

The method proceeds to check whether the boundary 71 defines the same geographical area as the new boundary 72, at completion check 106; if so, then the method terminates—the transition has completed and the boundary 71 has completed its transition in location to the location of the final boundary 72. If the boundary 71 is not the same as the final boundary 72, the method returns to step 102 (i.e. the boundary 71 is again expanded in the direction of the final boundary 72 along the path).

In an embodiment, the system controller 11 is configured to control the transition method such that the same boundary 71 (expanded or reduced in size) is applied to each of the collars 14 at the same time. In another embodiment, each collar 14 is configured to implement the method of FIG. 7b independently of one or more of the other collars 14 (for example, all of the other collars 14). Thus, although the system controller 11 provides the same new boundary 72 for the collars 14 located within the current boundary 71, it is not necessarily the case that the boundary 71 associated with each collar 14 is moved at the same rate. In another embodiment, each collar 14 is configured to implement the method of FIG. 7b while receiving information from one or more of the other collars 14—preferably, for a particular grouping of animals, the information may be received from all of the other collars 14. For example, the information can be transmitted via a local mesh (e.g. Bluetooth mesh) network between the collars 14. This information can then be utilised by a particular collar 14 when controlling its own transition. For example, in embodiments where some or all collars 14 (and therefore animals) must be within a transition zone, each of the collars 14 can communicate to the other collars 14 its current location, such that each collar 14 can determine when the transition condition is met.

Figure 7D:
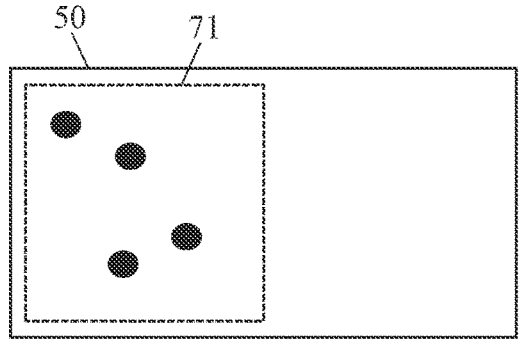
FIGS. 7d, 7e, and 7f show different examples of moving animals from a boundary to a new boundary.
Figure 7D:
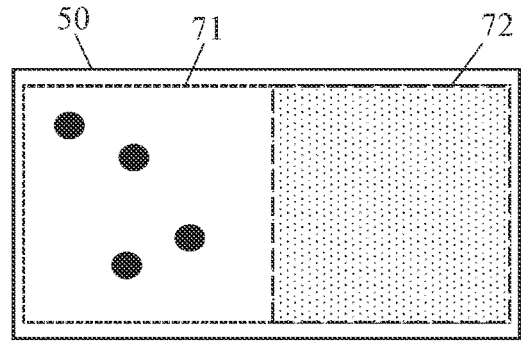
Figure 7D:
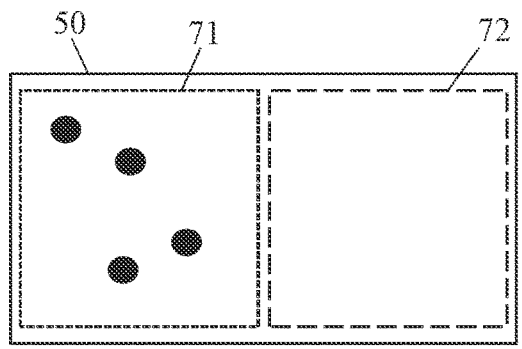
Figure 7D:
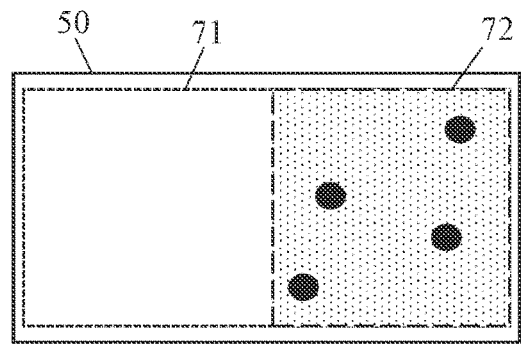
Figure 7D:
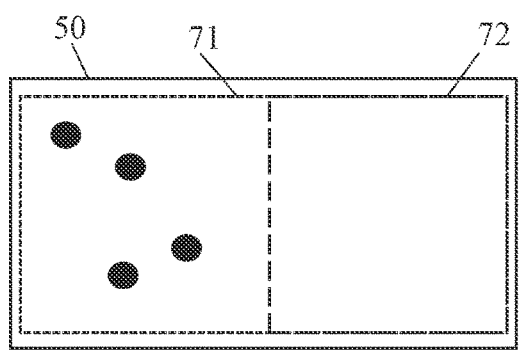
Figure 7D:
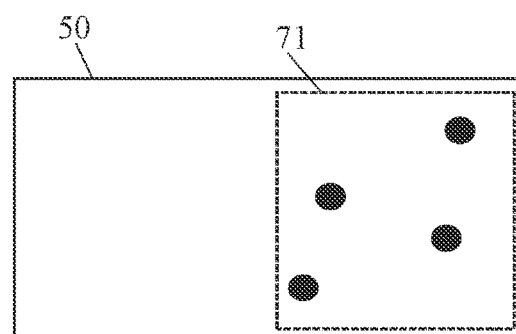

FIG. 7d shows an example of moving collars 14 (and therefore animals) from one location to another. This may correspond to an entire transition or one step of a transition. Frame A shows the collars 14 within a region of a map 50 within a current boundary 71. Frame B shows the identification of a new boundary 72, as well as the existing boundary 71. Frame C shows the boundary 71 being expanded—in the embodiment shown, the expanded boundary 71 encompasses the entire new boundary 72. However, more generally in a multi-step transition, it may not encompass the entire new boundary 72 in the first expansion. Frame D shows the transition zone being the same as the area defined by the new boundary 72. Frame E shows a predetermined number of the collars 14 (in this example, 100% of the collars 14), having moved into the transition zone. Frame F shows the resized (reduced) boundary 71 which now corresponds to the new boundary 72.

Figure 7E:
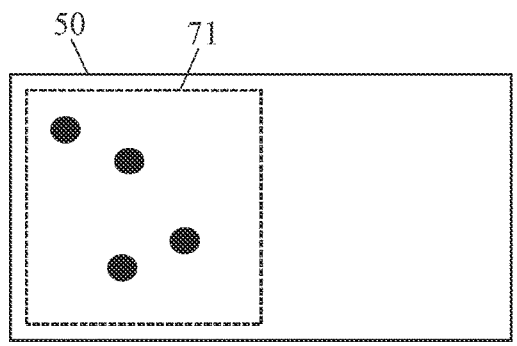
Figure 7E:
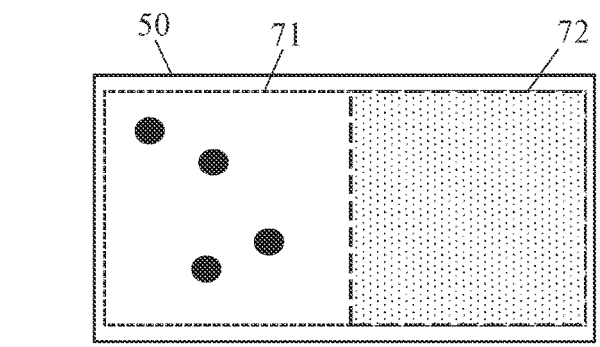
Figure 7E:
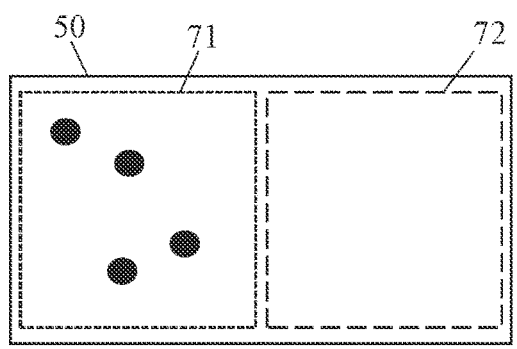
Figure 7E:
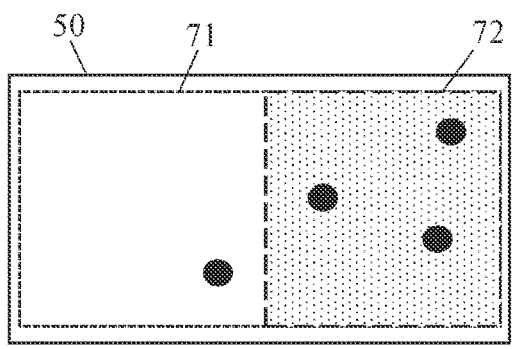
Figure 7E:
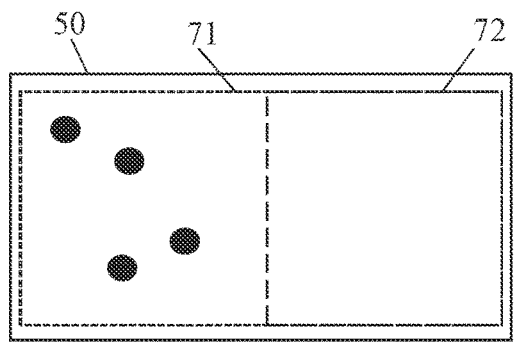
Figure 7E:
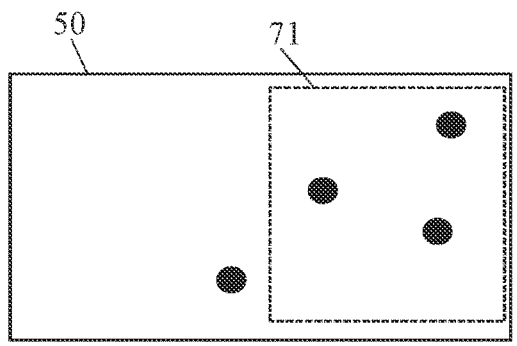
Figure 7E:
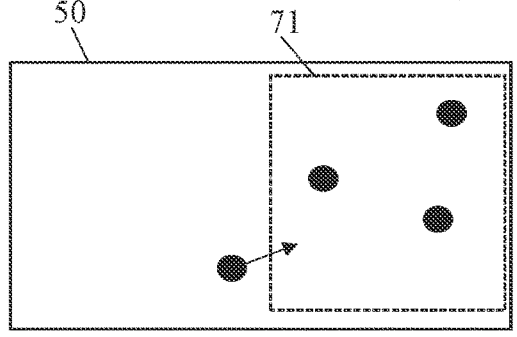

FIG. 7e shows an example of moving collars 14 (and therefore animals) from one location to another. In this case, there are effectively two steps to the transition from the current boundary 71 to the new boundary 72. Frame A shows the collars 14 within a region of a map 50 within a current boundary 71. Frame B shows the identification of a new boundary 72, as well as the existing boundary 71. Frame C shows the boundary 71 being expanded to encompass the entire new boundary 72. However, more generally in a many-step transition, it may not encompass the entire new boundary 72 in the first expansion. Frame D shows a predetermined number of the collars 14 (in this example, at least 75% of the collars 14), having moved into the transition zone which comprises the new boundary 72. Frame E shows the resized (reduced) boundary 71 which now corresponds to the transition zone with three collars 14 within the resized boundary 71 and one without. In practice, the collar 14 associated with the animal outside the boundary will be operated such as to encourage the animal to move to within the new location of the boundary 71 (e.g. a stimulus may be applied if the animal moves further away from the new location), until it reaches the new location of the boundary 71 (as shown in Frame G).

Figure 7F:
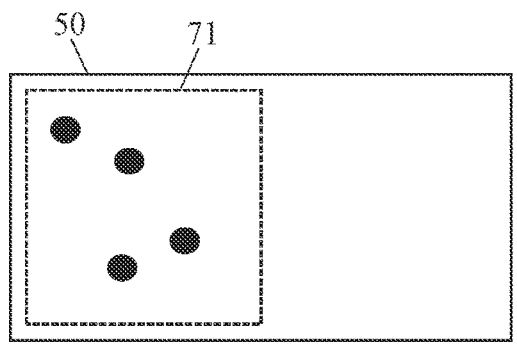
Figure 7F:
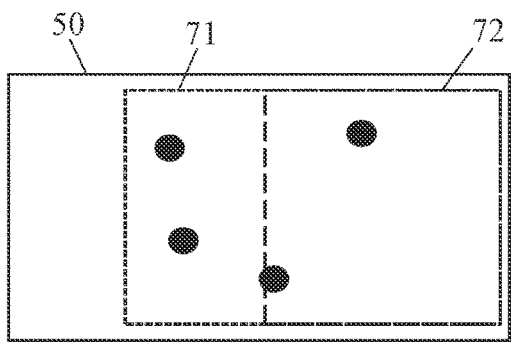
Figure 7F:
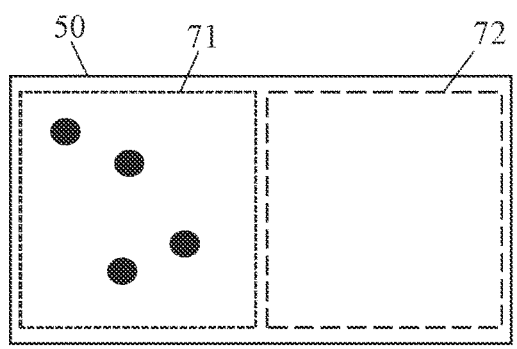
Figure 7F:
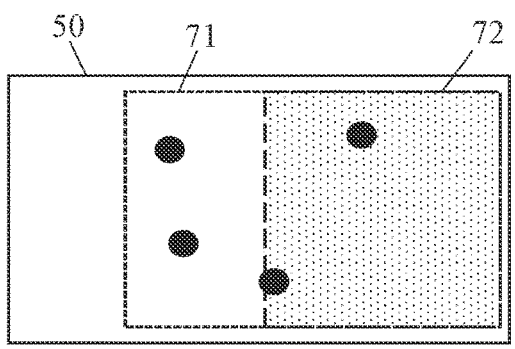
Figure 7F:
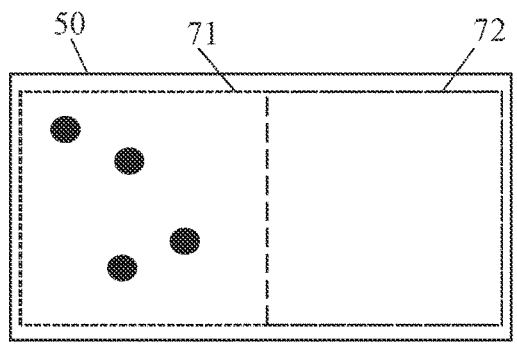
Figure 7F:
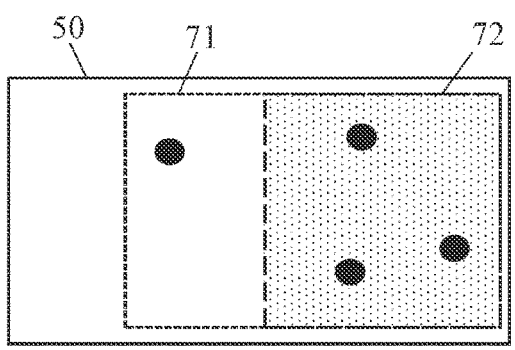
Figure 7F:
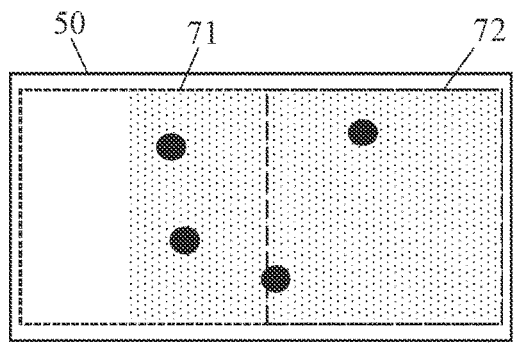
Figure 7F:
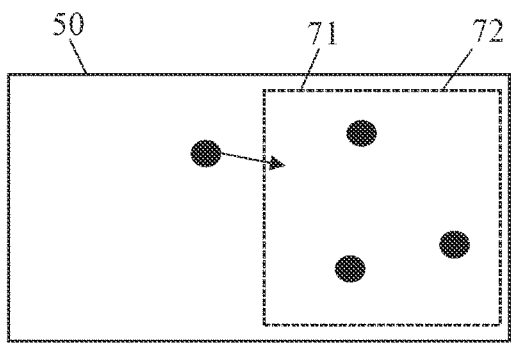

FIG. 7f shows an example of moving collars 14 (and therefore animals) from one location to another. In this case, there are effectively two steps to the transition from the current boundary 71 to the new boundary 72. Frame A shows the collars 14 within a region of a map 50 within a current boundary 71. Frame B shows the identification of a new boundary 72, as well as the existing boundary 71. Frame C shows the boundary 71 being expanded to encompass the entire new boundary 72. However, more generally in a many-step transition, it may not encompass the entire new boundary 72 in the first expansion. Frame D shows a predetermined number of the collars 14 (in this example, at least 75% of the collars 14), having moved into the transition zone which comprises the new boundary 72. However, the transition condition also includes a minimum time between boundary changes and, coincidentally, all animals are within the transition zone after this minimum time. Frame E shows the resized (reduced) boundary 71 which now corresponds to the transition zone with all collars 14 within the resized boundary 71. However, as the transition zone included a region outside the new boundary 72 (i.e. that transition is not complete), a further transition step is required. The boundary is not required to be expanded again, only reduced in size, therefore a new transition zone is determined as shown in Frame F. In this instance, after the minimum time, the predetermined number of collars 14 (75%) is located within the transition zone but a fourth collar 14 is not. The boundary 71 is reduced in size and the animal associated with the fourth collar 14 may receive a stimulus and rejoins the remaining animals, as shown in Frame G.

Figure 8A:
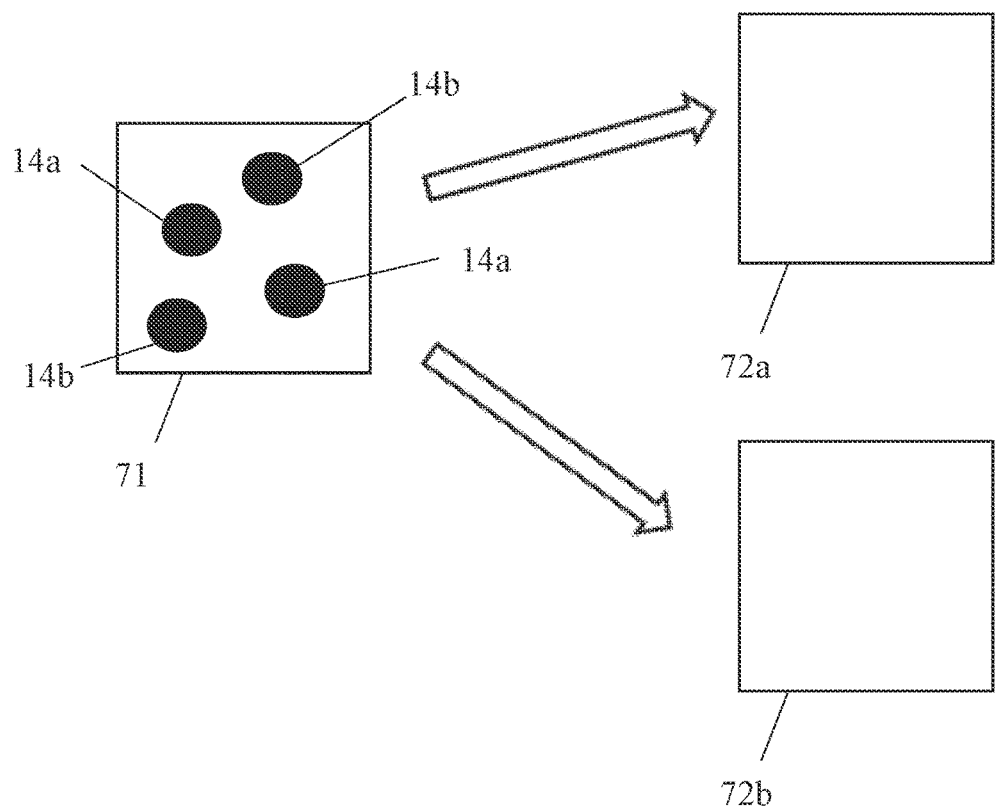
FIGS. 8a and 8b show a grouping of collars moved into two separate groupings of collars.
Figure 8B:
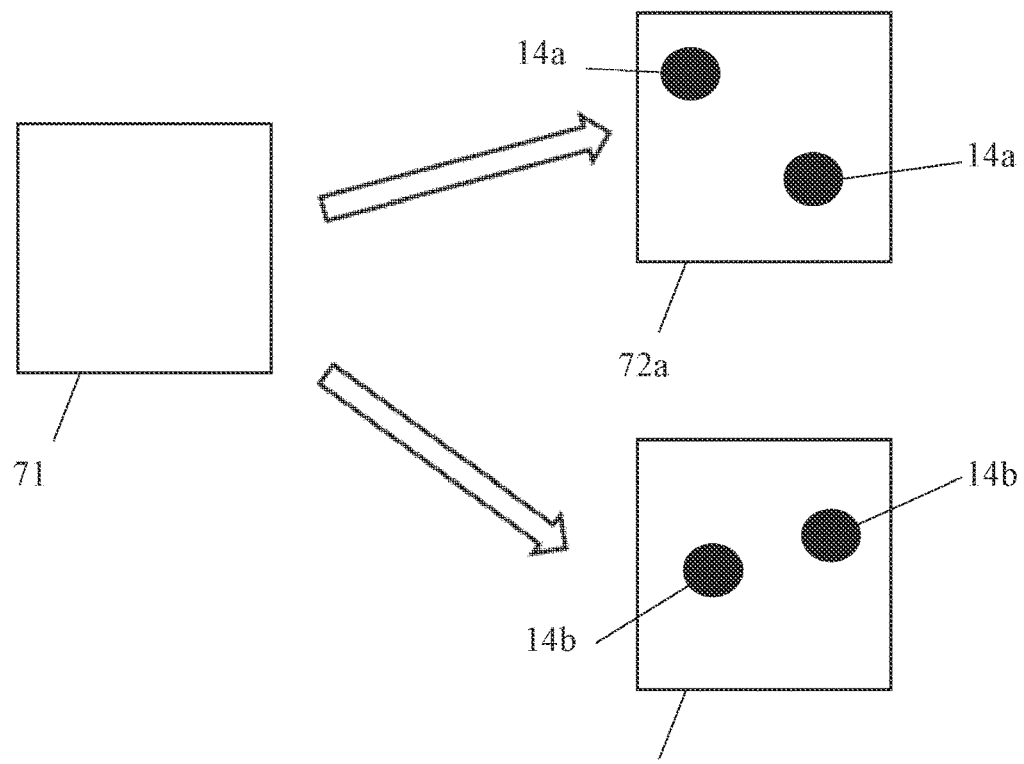

Referring to FIGS. 8a and 8b, in an embodiment, the collars 14 (and thus, the corresponding animals) may be split into two distinct groups. More generally, the collars 14 may be split into two or more distinct groups. Here, a group is defined as comprising one or more collars 14 to which a transition to a new boundary 72 is applied, and two different groups will have different new boundaries 72a, 72b assigned. FIG. 8a shows two groups of collars 14a, 14b originally within the same boundary 71. The first group of collars 14a is transitioned to a first new boundary 72a and the second group of collars 14b is transitioned to a second new boundary 72b. FIG. 8b shows the end result of both transitions; the first group of collars 14a are located within the boundary 71a and the second group of collars are located within the boundary 71b. In a variation of this embodiment, a portion of the animals within a boundary 71 are transitioned to a new boundary 72, while the remaining animals are kept within the original boundary 71. Generally, particular transitions can be applied on a per collar 14 basis.

In an embodiment, during a transition, the system controller 11 communicates updates to each collar 14 specifying boundary parameters for the collar 14. In turn, the collars 14 are configured to communicate updates to the system controller 11 of their location. Thus, the determination of the collars 14 meeting the transition condition is determined by the system controller 11, and expansions of the boundary 71 currently applicable each collar 14 are communicated to the collars 14 by the system controller 11. Similarly, the reductions in the boundary 71 currently applicable each collar 14 are communicated to the collars 14 by the system controller 11. Thus, the system controller 11 is effectively responsible for implanting the transition method.

In another embodiment, the system controller 11 is configured to determine a transition parameter set for each collar 14, and to communicate the transition parameter sets to the collars 14. The collars 14 are then configured to determine the expansions and reductions in the boundary 71. The collars 14 may be configured to communicate with each other such as to synchronise determination of the transition condition and changes to the boundary 71. In a variation, one collar 14 amongst a plurality of collars 14 to which the same transition is applicable is enabled to implement the transition method and is configured to receive location information from the other collars 14 and to communicate changes in boundary 71 to the other collars 14.

In an embodiment, the system controller 11 is configured to control the collars 14 to cause a repeating transition on a recurring basis. For example, when the animals are required to move from one place to another on a recurring basis (e.g. for milking), the system controller 11 can be configured to cause a transition such as to cause the animals to move from the first location to the second location at the appropriate time (e.g. at the same time each day). Similarly, the system controller 11 can be configured to move the collars 14 from the second location to the first location after a preconfigured time (e.g. again, at the same time each day a specified time after the original move).

In an embodiment, the collars 14 are configured to provide a non-aversive stimulus to the animal when the animal is required to transition to a new boundary 72. This may be advantageously useful when there is a recurring movement (such as required for milking on a twice-daily basis). In this way, the animals may be trained to associate the non-aversive stimulus with a need to move to the second location. Advantageously, this may reduce the occurrence of the application of an aversive stimulus to the animals. It may be that the non-aversive stimulus is different (e.g. a different sound) to the non-aversive stimulus associated with operation of the collar 14.

The number of steps in the transition may be set by the user. However, in an embodiment, the number of steps is determined by the system controller 11 in accordance with preconfigured decision rules—these may depend, for example, on the distance between the current boundary 71 and the new boundary 72. Other preconfigured decision rules may take into account one or more of: the terrain between the current boundary 71 and the new boundary 72, the species and/or breed of the animals to which the collars 14 are attached, the familiarity of the animals with the particular transition (e.g. for regular transitions), etc. In a general sense, more steps will require more transitions but may benefit in that smaller movements of the animals are required before a transition occurs. Fewer steps may result in overall less processing and therefore energy usage by the collars 14. The particular selection of steps may be designed to take advantage of particular animal behaviour characteristics, such as for example the tendency for certain animals to congregate. Although this may result in some collars 14 (and therefore animals) being outside the boundary 71 after a reduction is size (and therefore subjected to aversive or non-aversive stimulus), for certain animals, the desire to join the herd may ensure that these animals in the exclusion zone move quickly towards the (new) inclusion zone.

In an embodiment, if one or more collars 14 have not moved into the transition zone within a certain time, these collars 14 are excluded from the transition process. It may be that a small boundary 71 is placed around the, or each, collar 14 of such animals such that the associated animal is relatively confined. This may assist with human intervention (e.g. by a farmer).

In an embodiment, part or all of the new boundary 72 may be located within the initial boundary 71. For example, it may be required to contract the virtual fence around one or more animals. The transition method may be applied as described, with one or more steps required to move to the new, smaller, boundary 72. For example, it may be desirable to move the animals to geographic location within the initial boundary 71, such as a watering point or feeding point.

According to an embodiment, the first expansion of the boundary 71 results in a portion of the boundary 71 encompassing the entire new boundary 72—therefore, the expanded boundary 71 encompasses the boundary 71 before expansion and the entire new boundary 72. Each additional step then acts to reduce the size of the boundary 71 along the path until it is commensurate with the final boundary 72.

In the event that an animal enters a permanent exclusion zone, the system controller 11 (or alternatively, the actual collar 14) can be configured to take remedial action. For example, a path 75 may be created between the current location of the animal and the nearest inclusion zone, and a transition as according to the methods described herein applied to that particular animal. The creation of the path 75 and subsequent expansion of the boundary 71 may override the permanent exclusion zone while the animal is moved out of the exclusion zone. The remedial action may occur after a predetermined time (or other condition) of applying a stimulus to the animal and will involve not applying the stimulus at least while the animal remains within the path 75.

Generally, the transition parameters selected (steps, timing, number of animals within a transition zone before a transition, etc.) can be selected based on the particular implementation. For example, the parameters can be selected in accordance with: herd size and/or social structure (in one example, animals more likely to follow a leader may receive a more aggressive transition compared to relatively independent animals); animal density such as number of animals per land area; paddock size; animal stage of life (for example, younger animals may require less abrupt transitions compared to older animals); quality, quantity, location and accessibility of resources (e.g. feed, water, shelter, conspecifics etc.); farm factors (for example, whether the transition is novel or common, motivation for animals to move, farmer/stockperson input); and nature of any features or obstacles present (for example, gullies, dams, solid fences in disrepair etc that the animals must negotiate).

Further modifications can be made without departing from the spirit and scope of the specification.

The claims defining the invention are as follows:

1. A method for controlling two or more stimulus apparatuses, each configured to be worn by an animal, each stimulus apparatus comprising a controller interfaced with a location sensor and at least one stimulus output for providing a stimulus to the animal, the method implemented by the controller and comprising:
   receiving, via a data communication with a system controller external to the wearable stimulus apparatuses, a boundary specification;
   monitoring the location of each stimulus apparatus with respect to a boundary defined by the boundary specification;
   determining an expanded boundary expanded in a direction toward a final boundary and containing the boundary before expansion;
   identifying a transition condition including a transition zone, the transition zone comprising at least a portion of the expanded boundary;
   monitoring the location of each of the stimulus apparatuses;
   determining that the location of a first stimulus apparatus is within the transition zone;
   in response, reducing the size of the expanded boundary to define a new boundary that includes the transition zone and excludes at least a portion of the boundary before expansion;
   in the event that the new boundary does not coincide with the final boundary, iteratively performing the above steps with the new boundary as the boundary defined by the boundary specification; and
the controller causing the at least one stimulus output of a second stimulus apparatus to apply a stimulus to the animal only in response to detecting that the second stimulus apparatus is outside of the new boundary.

2. The method as claimed in claim 1, wherein the transition condition further comprises the controller determining that at least one other stimulus apparatus is also located within the transition zone.

3. The method as claimed in claim 1, wherein the transition zone comprises the entire part of the expanded boundary that was not part of the boundary before expansion.

4. The method as claimed in claim 1, wherein:
   the new boundary is equivalent to the transition zone.

5. The method as claimed in claim 1, wherein the method is applied to a plurality of stimulus apparatuses and the transition condition includes identifying the presence of a predetermined number of the stimulus apparatuses within the transition zone.

6. A method as claimed in claim 1, further comprising the steps of:
   defining a path between an original boundary and the final boundary, and
   applying at least one iteration of the method of claim 1, wherein each expansion of the boundary is in the direction along the path of the final boundary.

7. The method as claimed in claim 1, wherein:
   each stimulus apparatus is a collar worn around a neck of the animal.

8. A system comprising two or more stimulus apparatuses each configured to be worn by an animal, each stimulus apparatus comprising a controller interfaced with a location sensor and at least one stimulus output for providing a stimulus to the animal, wherein the controller is configured to cause the stimulus apparatuses to:
   receive, via a data communication with a system controller external to the wearable stimulus apparatuses, a boundary specification;
   monitor the location of each stimulus apparatus with respect to a boundary defined by the boundary specification;
   determine an expanded boundary expanded toward a final boundary and containing the boundary before expansion;
   identify a transition condition including a transition zone, the transition zone comprising at least a portion of the expanded boundary;
   monitor the location of each of the stimulus apparatuses;
   determine that the location of a first stimulus apparatus is within the transition zone;
   in response, reduce the size of the expanded boundary to define a new boundary that includes the transition zone and excludes at least a portion of the boundary before expansion;
   in the event that the new boundary does not coincide with the final boundary, iteratively performing the above steps with the new boundary as the boundary defined by the boundary specification; and
the controller causes the at least one stimulus output of a second stimulus apparatus to apply a stimulus to the animal only in response to detecting that the second stimulus apparatus is outside of the new boundary.

9. A virtual fencing system comprising a system controller and a plurality of stimulus apparatuses, wherein each stimulus apparatus is in data communication with the system controller, each stimulus apparatus configured to controllably apply a stimulus to an animal wearing the stimulus apparatus in dependence on the location of the stimulus apparatus to a boundary associated with the stimulus apparatus, and the system controller configured to:
   determine a boundary and communicate the boundary to each stimulus apparatus;
   determine an expanded boundary expanded toward a final boundary and containing the boundary before expansion and communicate the expanded boundary to each stimulus apparatus;
   identify a transition condition including a transition zone, the transition zone comprising at least a portion of the expanded boundary;
   monitor the location of each of the stimulus apparatuses;
   automatically determine that the location of a predetermined number of stimulus apparatuses are within the transition zone, the predetermined number defined by the transition condition;
   in response, automatically reduce the size of the expanded boundary to define a new boundary that includes the transition zone and excludes at least a portion of the boundary before expansion;
   automatically communicate the new boundary to each of the stimulus apparatuses;

in the event that the new boundary does not coincide with the final boundary, iteratively performing the above steps with the new boundary as the boundary defined by the boundary specification, and, only in response to detecting that any of the plurality of stimulus apparatuses are outside of the new boundary, the controller causes the at least one stimulus output of the stimulus apparatuses outside the new boundary to apply a stimulus to the animal.

10. The system as claimed in claim 9, wherein the predetermined number is equal to the number of stimulus apparatuses.

11. The system as claimed in claim 9, wherein the new boundary is equivalent to the transition zone.

12. The system as claimed in claim 9, wherein after defining the new boundary it:

includes the entire transition zone only; and/or excludes the entire boundary before expansion.

13. A method for controlling a stimulus apparatus configured to be worn by an animal, the stimulus apparatus comprising a controller interfaced with a location sensor and at least one stimulus output for providing a stimulus to the animal, the method implemented by the controller and comprising:

determining a boundary specification and monitoring the location of the stimulus apparatus with respect to the boundary defined by the boundary specification;

receiving new boundary parameters specifying a new boundary via a data communication with a system controller external to the wearable apparatus;

determining a transition comprising one or more transition steps, the transition corresponding from a change to the boundary such that, as a result of the transition, the boundary corresponds to the new boundary; and applying the one or more transition steps;

wherein a stimulus is applied to the animal in response to determining that the stimulus apparatus is outside of the boundary at a point during the transition, wherein between each step of the transition the boundary is changed according to the method of claim 1.

14. The method as claimed in claim 13, wherein the boundary is changed between each step of the transition continuously or smoothly or incrementally over a predetermined period of time.

15. A stimulus apparatus configured to be worn by an animal, the stimulus apparatus comprising a controller interfaced with a location sensor and at least one stimulus output for providing a stimulus to the animal, wherein the controller is configured to cause the stimulus apparatus to:

determine a boundary specification and monitor the location of the stimulus apparatus with respect to the boundary defined by the boundary specification;

receive new boundary parameters specifying a new boundary via a data communication with a system controller external to the wearable apparatus;

determine a transition comprising one or more transition steps, the transition corresponding from a change to the boundary such that, as a result of the transition, the boundary corresponds to the new boundary; and apply the one or more transition steps;

wherein a stimulus is applied to the animal in response to determining that the stimulus apparatus is outside of the boundary at a point during the transition, wherein for each transition step, the boundary is changed according to the method of claim 1.

* * * * *